United States Patent [19]

Barrett

[11] Patent Number: 4,701,809
[45] Date of Patent: Oct. 20, 1987

[54] IMAGING LARGE DOCUMENTS
[75] Inventor: Douglas J. Barrett, Bedford, Mass.
[73] Assignee: Eikonix Corporation, Bedford, Mass.
[21] Appl. No.: 866,133
[22] Filed: May 22, 1986
[51] Int. Cl.$^4$ .......................... H04N 1/10; H04N 1/40
[52] U.S. Cl. .................................... 358/293; 358/285; 355/70
[58] Field of Search .................. 358/285, 293; 355/70

[56] References Cited

U.S. PATENT DOCUMENTS

| Re. 29,067 | 12/1976 | Watson | 358/293 |
|---|---|---|---|
| 4,043,662 | 8/1977 | Garfall | 355/70 X |
| 4,367,038 | 1/1983 | Hisabayoshi et al. | 355/70 |
| 4,372,679 | 2/1983 | Weber | 355/70 |
| 4,404,597 | 9/1983 | Stoffel | 358/293 |

Primary Examiner—Edward L. Coles, Sr.
Attorney, Agent, or Firm—Charles Hieken

[57] ABSTRACT

A large document scanner has a transparent top plate glass plate large enough to support an E size drawing. The base of the cabinet supports a trapezoidal mirror tilted up from the bottom with the larger parallel side above the bottom. The image of a document on the transparent plate is reflected by the trapezoidal mirror to a digital imaging camera system having a mechanically displaced electronically scanned array located inside the cabinet to the side. Tubular lamps located adjacent to bowed out upper sides between upper and lower planar reflectors illuminate the document on the transparent top glass plate.

4 Claims, 4 Drawing Figures

IMAGING LARGE DOCUMENTS

The present invention relates in general to imaging and more particularly concerns novel apparatus and techniques for imaging large documents in conjunction with an image digitizing camera that facilitates representing large documents, such as architectural diagrams, in digital form suitable for electronic storage and processing, such as with the aid of computer techniques.

It is often desirable to scan large architectural and other drawings as large as 36"×46" in size for electronic storage or processing. A conventional prior art approach uses binary scanners with either a hand digitizer, or a series of arrays to capture an image by distinguishing only between black and white. Both of these methods generate less than desirable results.

It is an important object of this invention to provide improved methods and means for imaging large documents.

According to the invention, there is cabinet means having a transparent top surface for accommodating large drawings The transparent top surface faces a trapezoidal mirror inside the cabinet means angled to reflect the image of the transparent surface upon camera means for processing the image. The camera means is located inside the cabinet means outside the image region bounded by rays extending between the edges of the trapezoidal mirror and the edges of the transparent top surface. Some of these bounding rays may be regarded as comprising rays from the point where the camera lens would be if the path was not folded to the object area corners. The cabinet means is also formed with bulb means located above the camera means to the side of the image region and with reflecting means for directing reflected energy from the bulb means upon the transparent top surface. Typically, the bulb means comprises four bulbs around the perimeter of the cabinet means. Preferably the camera means is a digitizing camera for converting the image received by the camera means into digital signals representative of the image.

Numerous other features, objects and advantages of the invention will become apparent from the following specification when read in connection with the accompanying drawing in which.

Figure 1:
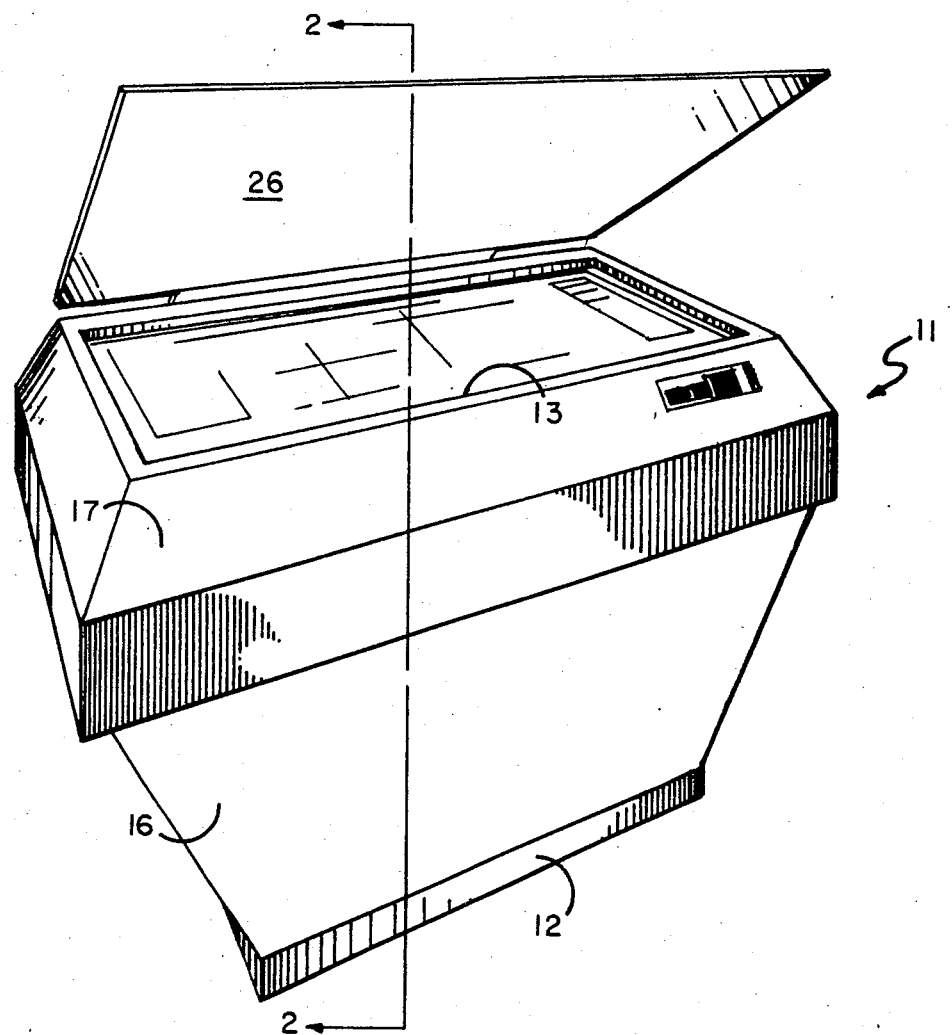
FIG. 1 is a perspective view of a commercial embodiment of the invention.
Figure 2:
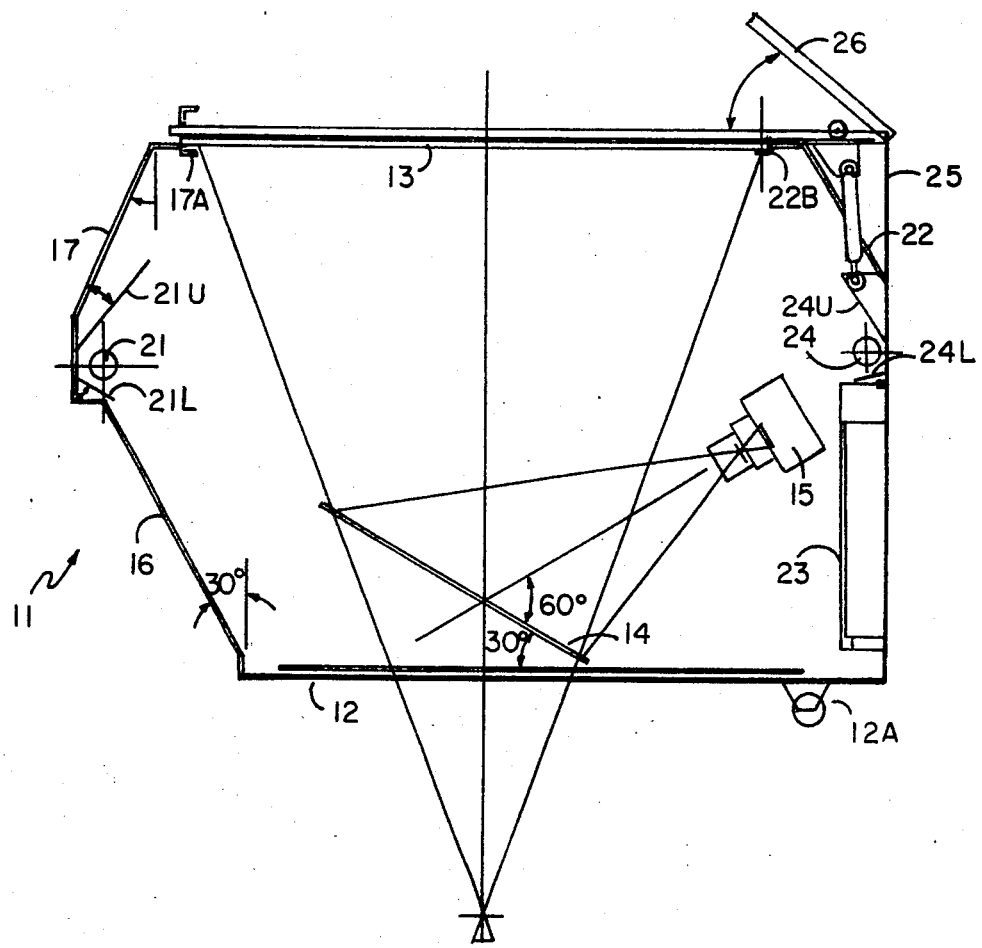
FIG. 2 is a vertical sectional view through section 2—2 of the embodiment of the invention of FIG. 1 which best and fully illustrates the principles of the invention.

With reference now to the drawing and more particularly FIGS. 1 and 2 thereof, there is shown perspective and vertical sectional views, respectively, through an embodiment of the invention which best and fully illustrates the principles of the invention. The invention comprises a document scanner 11 having a cabinet with a base 12 supported on wheels, such as 12A. The top of the cabinet includes a transparent glass plate 13, typically ⅜" thick plate glass 36"×48" to accommodate a drawing of that size. A trapezoidal mirror 14 is supported at an angle of 30° from base 12 tilted upward at the left and resting on base 12 at the right centered around the optical axis of scanning camera 15 for reflecting the image of the document on transparent glass plate 13 upon image scanning camera 15 positioned as shown.

The front side of the cabinet comprises an upwardly sloping lower front plate 16 supporting an upper front plate shaped as shown for accommodating a front tubular illuminating lamp 21 positioned as shown. Upper front plate 17 is formed with a recessed flange 17A at the top for supporting transparent glass plate 13. The rear side of the cabinet includes an upper rear plate 22, similar to front plate 17 formed with a recessed flange 22B at the top for supporting the other side of transparent glass plate 13. Upper rear plate 22 rests upon lower rear plate 23 which in turn rests on base 12. A rear tubular lamp 24 is positioned as shown adjacent to the lower portion of upper rear plate 22.

Tubular lamp 21 is between a lower reflecting plate 21L forming an angle of 30° with the vertical 1.5" wide and an upper reflecting plate 21U forming an angle of 40° with the vertical and substantially 4" wide. Rear tubular lamp 24 is located between similar reflectors 24L and 24U, respectively, of the same width for the entire length of these lamps. In an actual embodiment of the invention there are four tubular lamps and associated reflectors like those described above around the four sides of the cabinet.

An extension 25 at the upper right supports a hinge mechanism for cover 26 which may be raised to an angle of substantially 40° with the horizontal to allow a document to be placed on transparent glass plate 13 and then lowered to cover the document during scanning.

Figure 3:
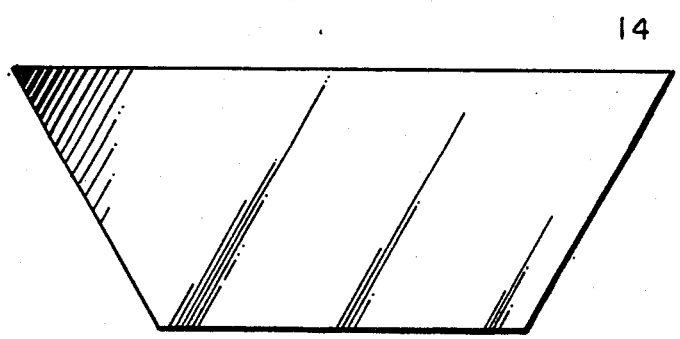
FIG. 3 is a plan view of the trapezoidal mirror.

Referring to FIG. 3, there is shown a plan view of mirror 14. The long side is the side further away from camera 15. The trapezoidal mirror facilitates reflecting the entire area of transparent glass plate 13 on the image scanning area of camera 15 positioned as shown. The folded optical path helps reduce the overall size of the apparatus while allowing scanning of large documents with camera 15 outside the image region bounded by rays extending between the edges of trapezoidal mirror 15 and the edges of transparent glass plate 13.

The arrangement of tubular lamps, such as 21 and 24, with reflectors positioned as shown provides illumination of the document covering transparent glass plate 13 that compensates for loss of light at edges caused by the lens, referred to as falloff.

Figure 4:
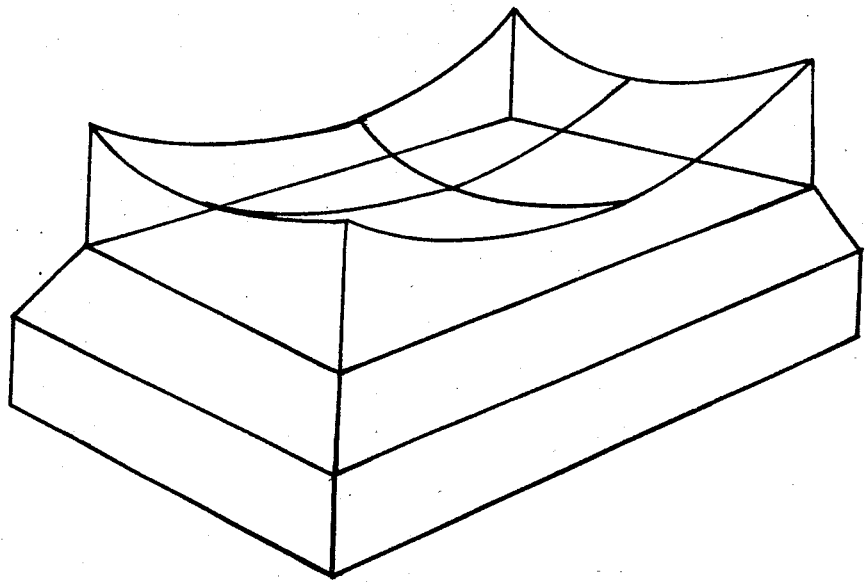
FIG. 4 is a perspective diagrammatic representation of the illumination pattern.

Referring to FIG. 4, there is shown a perspective view of a diagrammatic representation of the illumination distribution over the object surface that compensates for lens falloff. Note highest intensity illumination is in the corners and least at the center.

Preferably camera 15 is a commercially available Eikonix Series 850 digital imaging camera that comprises a single linear 4096-element charge-coupled device (CCD) array that electronically scans each line of the image reflected upon camera 15 by trapezoidal mirror 14 and is mechanically displaced from line to line to complete the scan of the image of the entire document on transparent glass plate 13.

The invention is embodied in the commercially available E-Z SCAN Model 4434 large document scanner, and the disclosure of that commercially available scanner is incorporated herein by reference.

The commercial embodiment of the invention has a number of features. Using a single array to capture the image eliminates the need for electronic seaming while preserving the original image content. The commercial embodiment features a fixed scanning resolution of 110 lines per inch. With the preferred EIKONIX Series 850 digital imaging camera system, the invention perceives 64 different levels of gray to preserve lines that might otherwise be lost through fixed binarization. This feature results in greater image detail being resolved and lowers the storage requirements. Degradation of a drawing is minimized by the invention. A drawing is captured by stepping the array across the image field of view instead of moving the drawing across the array. Conventional scanners transport the drawing over a series of paper rollers while it is being scanned, resulting in less geometric fidelity and potential damage to the original.

The commercial embodiment of the invention is as easy to use as a conventional copying machine. It is characterized by high speed, typically completing a scan within the range of 2-4 minutes, depending on the image quality, high spatial resolution (maximum of 4096×5200 pixels). It can readily handle A, B, C, D and E size documents (European A0-A4) varying in size form 8½×11 to 34×44 and image blue prints, black and white original line drawings, sepias, mylar prints, vellum, maps and other documents.

It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Large document imaging apparatus comprising,
    cabinet means for supporting said apparatus,
    said cabinet means including a transparent top plate for supporting large documents to be imaged, a base and side panels,
    camera means supported in said cabinet means and having lens means characterized by falloff for focusing images of said large documents,
    mirror means inside said cabinet means angled upward from said base for reflecting the image of a document on said transparent top plate upon the image plane of said camera means to define an image region bounded by said transparent top plate, said mirror means and rays extending between the edges of said transparent top plate and the edges of said mirror means,
    and illuminating means in said cabinet means outside said image region nonuniformly illuminating said transparent top plate with increasing intensity toward the edges thereof to compensate for said falloff.

2. Large document imaging apparatus in accordance with claim 1 wherein said illuminating means comprises a plurality of lamps around said transparent top plate and reflecting means for reflecting energy from each of said lamps so as to provide a light intensity on said transparent top plate that increases progressively with distance from the center of said transparent top plate.

3. Large document imaging apparatus in accordance with claim 1 wherein said camera means comprises a mechanically stepped electronically scanned array of photoelectric transducing elements.

4. Large document imaging apparatus in accordance with claim 1 wherein said mirror means is a trapezoidal mirror,
    said camera means being located outside said image region.

* * * * *